United States Patent Office 2,883,423
Patented Apr. 21, 1959

2,883,423

2-ARALKANOYL-1,3-INDANEDIONE,1-MONO-HYDRAZONES

William A. Mosher and Robert A. Braun, Newark, Del., assignors to Nease Chemical Company, Inc., Lock Haven, Pa., a corporation of Pennsylvania No Drawing. Application September 2, 1958
Serial No. 758,574

15 Claims. (Cl. 260—566)

The present invention relates to new and advantageous carbonyl reagents and is more particularly concerned with the 1-monohydrazones of 2-aralkanoyl-1,3-indanediones, having the following structural formula:

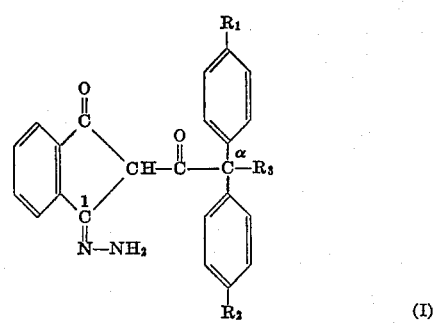

wherein $R_1$ and $R_2$ are the same or different and represent hydrogen, lower-alkyl, lower-alkoxy, or halogen, and wherein $R_3$ is hydrogen, lower-alkyl, or

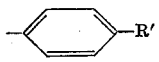

wherein R' has the same value as $R_2$. In the preferred embodiment of the invention, $R_3$ is hydrogen. "Lower-alkyl" and "lower-alkoxy," as used herein, mean such radicals containing from one to eight, and preferably one to four, carbon atoms, inclusive, being preferably but not necessarily straight-chain radicals.

The compounds of the present invention are useful as carbonyl reagents, having value in the systematic identification and characterization of carbonyl compounds. The properties of the 1-monohydrazone compounds of the present invention are unique. They are unexpectedly stable to heat and to mineral acids, in contrast to the monohydrazones of other 2-acyl-1,3-indanediones. For example, the 1-monohydrazone of 2-diphenylacetyl-1,3-indanedione is stable at 100 degrees centigrade for four days or more, whereas other 2-acyl-1,3-indanedione monohydrazones, e.g., the 2-acetyl, 2-propionyl and 2-phenylacetyl-1,3-indanedione monohydrazones (none of which are included within the scope of the present invention and in all of which the hydrazone group preferentially locates at the side chain carbonyl and not on the five-membered indanedione ring, much less specifically at the 1-position of the said ring), decompose in a much shorter time and are otherwise unsuitable for use as carbonyl reagents.

The 1-monohydrazones of the present invention react with aldehydes and ketones to form mixed azines, according to the following sequence:

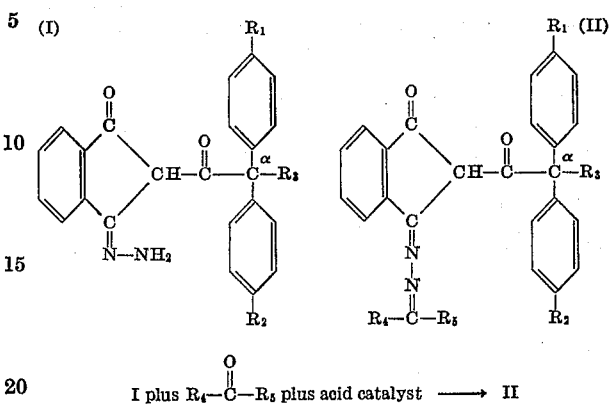

I plus $R_4 - \overset{O}{\underset{\|}{C}} - R_5$ plus acid catalyst ⟶ II wherein $R_4$ and $R_5$ are the organic radicals of the aldehyde or ketone (carbonyl) compound, $R_5$ in the case of an aldehyde being hydrogen, and wherein $R_1$, $R_2$ and $R_3$ have the values hereinbefore assigned.

The value of the novel 1-monohydrazones of the present invention is all the more noteworthy in view of their pronounced advantages over known and presently utilized carbonyl reagents. All of the available reagents for carbonyl compounds (such as 2,4-dinitrophenyl-hydrazine, phenylhydrazine, semicarbazide, etc.) suffer from some disadvantages. The new 2-aralkanoyl-1,3-indanedione, 1-hydrazone reagents, especially the preferred embodiment of the invention 2-diphenylacetyl-1,3-indanedione, 1-hydrazone, are superior to the available reagents for carbonyl compounds in the following ways:

(1) The reaction is very rapid (generally complete in less than five minutes), thus allowing the rapid identification and characterization of aldehydes and ketones.

(2) The reagents form highly crystalline derivatives with some carbonyl compounds which are generally difficult to characterize, for example:

(a) Dibutyl ketone (5-nonanone)- the phenylhydrazone and 2,4-dinitrophenylhydrazone are oils. Derivative with 2-diphenylacetyl-1,3-indanedione,1-hydrazone is a yellow crystalline solid, M. P. 138–138.5 degrees centigrade.

(b) Methyl hexyl ketone (2-octanone)- the phenylhydrazone is an oil and the 2,4-dinitrophenylhydrazone is very difficult to crystallize. Derivative with 2-diphenylacetyl-1,3-indanedione,1-hydrazone is yellow needles, M. P. 128.5–130.5 degrees centigrade.

(3) Derivatives of the reagents with aldehydes and ketones are strongly fluorescent in ultra-violet light. The fluorescence makes it possible to identify trace amounts of aldehydes and ketones by such methods as paper chromatography or column chromatography with alumina. The azines derived from similar monohydrazones having the hydrazone group in the side-chain are completely non-fluorescent. Only the aldehyde and ketone derivatives using 2-diphenylacetyl-1,3-indandione,1-hydrazone and the related 1-hydrazone compounds of the present invention are strongly fluorescent.

(4) It has been found that none of the following functional groups in aldehydes and ketones interfere with the preparation of derivatives with 2-diphenylacetyl-1,3-indanedione,1-hydrazone and related compounds of the present invention: halo, e.g., chloro, bromo; nitro, hydroxy, phenoxy, alkoxy, e. g., methoxy, heterocyclic groups such as pyridine or furan rings, sterically bulky groups such as t-butyl or 1,1-diphenylmethyl groups, dialkylamino, e.g., dimethylamino; carbalkoxy, e.g., carbethoxy; carboxyl, or unsaturated groups. The derivatives of aromatic and aliphatic aldehydes and ketones can be prepared with equal facility.

(5) The melting points of the mixed azine derivatives are in the useful range (70 to 300 degrees centigrade) and there is generally sufficient difference in the melting points of derivatives of closely related aldehydes and ketones for satisfactory identification.

In preparing the 1-monohydrazones of the present invention, the starting indandione is dissolved in an organic solvent such as methanol or ethanol or aqueous methanol or ethanol, and hydrazine or hydrazine hydrate is added. It is desirable to carry out the reaction at the reflux temperature of the solvent used. After cooling, the 1-monohydrazone formed is separated by filtration and washed with ether. The product may be purified by recrystallization from an organic solvent such as ethanol, methanol or a mixture of dimethylformamide and water.

In the case of those 1-monohydrazones (such as the 2 - diphenylacetyl - 1,3 - indanedione,1 - monohydrazone) which do not readily form under such conditions, a solvent such as tertiary butyl alcohol or a mixed solvent, such as ethanol and water or methanol and water, is advantageously employed, together with an excess, usually a two to three times excess, of hydrazine or hydrazine hydrate. The reaction is in any case usually carried out at the reflux temperature of the solvent system employed. The product is usually obtained in the form of crystals or needles which are separated by filtration and which may, if desired, be purified by recrystallization from a selected organic solvent, as indicated in the foregoing.

Some of the 2-aralkanoyl-1,3-indanediones are known. Those which are not known may be prepared by condensation of a selected phenylalkyl methyl ketone with a dialkyl-phthalate in the presence of an alkali-metal alkoxide and an inert solvent, preferably with the removal of alcohol produced during the reaction from the reaction zone as it is formed, generally in accord with the procedure of U.S. Patent 2,827,489. The reaction occurs according to the following sequence:

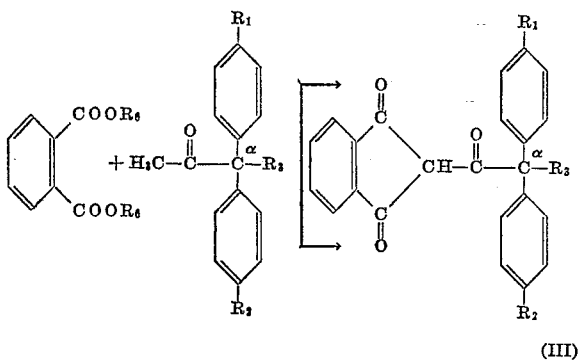

(III)

wherein $R_1$, $R_2$ and $R_3$ have the values previously assigned and $R_6$ is lower-alkyl. Suitable inert solvents for the reaction are benzene, toluene, ether, or the like, preferably benzene; suitable alkali metal alkoxides are sodium or potassium alkoxides, preferably sodium or potassium methoxide; suitable dialkyl phthalates are dimethyl, diethyl, dipropyl and dibutyl phthalate, the dimethyl being preferred.

Starting 2-aralkanoyl-1,3-indanediones, either known or prepared in the foregoing manner by reaction of dimethyl or other dialkyl phthalate with the phenyalkyl methyl ketones given hereinafter, include the following:

2-diphenylacetyl-1,3-indanedione,
2-($\alpha,\alpha$-diphenylpropionyl)-1,3-indanedione,
2-($\alpha,\alpha$-diphenylbutyryl)-1,3-indanedione,
2-($\alpha,\alpha$-diphenyl-p-methylbutyryl)-1,3-indanedione,
2-($\alpha,\alpha$-diphenylvaleryl)-1,3-indanedione,
2-($\alpha,\alpha$-diphenylhexanoyl)-1,3-indanedione,
2-($\alpha,\alpha$-diphenylheptanoyl)-1,3-indanedione,
2-($\alpha,\alpha$-diphenyloctanoyl)-1,3-indanedione,
2-($\alpha,\alpha$-diphenylnonanoyl)-1,3-indanedione,
2-($\alpha,\alpha$-diphenyldecanoyl)-1,3-indanedione,
2-triphenylacetyl-1,3-indanedione, and corresponding lower-alkyl, lower-alkoxy, or halogen-substituted 2-aralkanoyl-1,3-indanediones, for example, 2-[di(para-methylphenyl)acetyl]-1,3-indanedione,
2-[di(para-isopropylphenyl)acetyl]-1,3-indanedione,
2-[di(para-methoxyphenyl)acetyl]-1,3-indanedione,
2-[di(para-propoxyphenyl)acetyl]-1,3-indanedione,
2-[di(para-isopropoxyphenyl)acetyl]-1,3-indanedione,
2-[di(para-chlorophenyl)acetyl]-1,3-indanedione,
2-[di(para-bromophenyl)acetyl]-1,3-indanedione,
2-[di(para-fluorophenyl)acetyl]-1,3-indanedione,
2-[di(para-iodophenyl)acetyl]-1,3-indanedione,
2-[phenyl-(para-chlorophenyl)acetyl]-1,3-indanedione,
2 - [$\alpha,\alpha$ - di(para - methoxyphenyl)propionyl] - 1,3 - indanedione,
2 - [$\alpha$ - (para - methylphenyl) - $\alpha$ - (para-methoxyphenyl)propionyl]-1,3-indanedione,
2 - [$\alpha$ - phenyl - $\alpha$ - (para - methoxyphenyl)propionyl]-1,3-indanedione,
2-[tri(para-methylphenyl)acetyl]-1,3-indanedione,
2-[tri(para-methoxyphenyl)acetyl]-1,3-indanedione,
2-[tri(para-chlorophenyl)acetyl]-1,3-indanedione,
2-[tri(para-fluorophenyl)acetyl]-1,3-indanedione,
2-[tri(para-bromophenyl)acetyl]-1,3-indanedione, and the like. All of these are converted to the corresponding 1-monohydrazone according to the procedure of either Example 1 or Example 2.

Representative starting phenylalkyl methyl ketones are:

1,1-diphenylpropanone-2, 3,3-diphenylbutanone-2,
3,3 - diphenylpentanone - 2, 3,3 - diphenyl - 4 - methylpentanone-2,
3,3-diphenylhexanone-2, 3,3-diphenylheptanone-2,
3,3-diphenyloctanone-2, 3-3-diphenylnonanone-2,
3,3-diphenyldecanone-2, 3,3-diphenylundecanone-2,
1,1,1-triphenylpropanone-2, and the corresponding lower-alkyl, lower-alkoxy, or halogen-substituted phenylalkyl methyl ketones, for example, 1,1-di(para-methylphenyl)propanone-2,
1,1-di(para-isopropylphenyl)propanone-2,
1,1-di(para-methoxyphenyl)propanone-2,
1,1-di(para-isopropoxyphenyl)propanone-2,
1,1-di(para-chlorophenyl)propanone-2,
1,1-di-para-bromophenyl)propanone-2,
1,1-di(para-fluorophenyl)propanone-2,
1,1-di(para-iodophenyl)propanone-2,
1,1-di(para-propoxyphenyl)propanone-2,
1-phenyl-1-(para-chlorophenyl)propanone-2,
3,3-di(para-methoxyphenyl)butanone-2,
3 - (para - methylphenyl) - 3 - (para - methoxyphenyl)-butanone-2,
3-phenyl-3-(para-methoxyphenyl)butanone-2,
1,1,1-tri(para-methylphenyl)propanone-2,
1,1,1-tri(para-methoxyphenyl)propanone-2,
1,1,1,-tri(para-chlorophenyl)propanone-2,
1,1,1-tri(para-fluorophenyl)propanone-2,
1,1,1-tri(para-bromophenyl)propanone-2, and the like. Starting phenylalkyl methyl ketones are known. When not known, they may be prepared by reaction of acetyl chloride with a selected di- or triphenylmethyl sodium (either substituted or unsubstituted in one or both of the phenyl rings) under mild conditions or by condensing a selected aromatic compound (e.g., benzene, toluene, chlorobenzene, anisole, or the like) with an α-aryl-α-bromoalkyl alkyl ketone in the presence of aluminum chloride and the usual solvents, e.g., nitrobenzene or carbon disulfide, to establish the second aryl group at the α-position in the then polyaryl alkyl alkyl ketone molecule. Other procedures are available and will be apparent to one skilled in the art.

As previously stated, the monohydrazones of the present invention (Formula I) react with carbonyl compounds to form mixed azines (Formula II) and for this reason are useful as carbonyl reagents. The reaction of the 1-monohydrazones of the invention with carbonyl compounds, e.g., aldehydes and ketones, is always catalyzed by a small amount of an acid, either a mineral acid, an organic sulfonic acid, or a Lewis acid, for example, hydrochloric, sulfuric, nitric, phosphoric, or p-toluene sulfonic acid, or boron trifluoride-etherate. The preferred solvent for the reaction is chloroform, but other organic solvents such as ethanol, dioxane, carbon tetrachloride, dimethylformamide, or ether can be used. The reaction is usually conducted at the reflux temperature of the reaction mixture and for a short period, e.g., usually less than fifteen and ordinarily only five to ten minutes at the most.

A representative more detailed procedure for preparing the mixed azines is as follows: A mixture of 0.005 mole of carbonyl compound, 0.0045 mole of the selected 2-aralkanoyl-1,3 - indandione,1 - hydrazone carbonyl reagent, twenty to thirty milliliters of chloroform and two drops of concentrated hydrochloric acid is warmed at reflux until a deeply colored, nearly clear solution is obtained. The time for reaction will vary from a few minutes to about ten minutes depending upon the structure of the carbonyl compound. The solution is filtered hot to remove any unreacted reagent. About twenty milliliters of methanol or ether is added to the filtrate. Usually the derivative will crystallize immediately. If there is no crystallization, the solvent is removed in vacuo to a volume of about two milliliters or less and the methanol or anhydrous ether is added. The crystalline product is filtered and recrystallized from a chloroform-methanol mixture using as little chloroform as possible, then oven-dried at seventy to 100 degrees centigrade, or air dried. Usually one recrystallization is sufficient to give an analytically pure derivative. The derivatives are fluorescent and intensely colored crystalline solids. For quantitative preparation of derivatives, a five to ten percent excess of 2-aralkanoyl-1,3-indandione,1-hydrazone carbonyl reagent is used. Sufficient derivative for melting point, analysis and spectra usually can be obtained by using one-half to one-quarter of the amounts specified.

Additional details of the preparation of the compounds of the invention and their use are presented in the following examples, which are given for purposes of illustration and not by way of limitation. Parts therein are by weight.

*Example 1.—2-diphenylacetyl-1,3-indanedione,1-hydrazone*

2-diphenylacetyl - 1,3 - indanedione (68 parts) (M.P. 145–145.5 degrees centigrade) in a mixture of water (600 parts) and methanol (150 parts) was treated with hydrazine (20 parts) and the mixture was heated at reflux for three hours with stirring. The orange solid which separated was collected, washed with water and then with chloroform, and oven-dried at 100 degrees centigrade. There was thus obtained 69 parts of 2-diphenylacetyl-1,3 - indandione,1 - hydrazone. The orange crystals melted at 305 degrees centigrade after recrystallization from a mixture of dimethylformamide and water.

*Analysis.*—Calculated for $C_{23}H_{18}N_2O_2$: C, 77.95; H, 5.12. Found: C, 77.92; H, 5.11.

*Example 2.—2-diphenylacetyl-1,3-indanedione,1-hydrazone*

General directions for preparation of approximately one (1) pound of this reagent:

Starting materials:
  443 grams 2-diphenylacetyl-1,3-indanedione
  130 grams hydrazine (95%) or 194 grams hydrazine hydrate
  3.9 liters water (about one gallon)
  0.98 liter methanol Directions:
1. Mix solvents and add 2-diphenylacetyl-1,3-indanedione
2. Heat to fifty to seventy degrees centigrade with vigorous stirring
3. Add hydrazine over period of ten minutes
4. Heat to reflux and then reflux with stirring for an addiitonal four (4) hours
5. Cool to room temperature
6. Filter product and dry under vacuum
7. Wash with four one-liter portions of water
8. Wash with two one-liter portions of chloroform
9. Dry at about 100 degrees centigrade for six to eight hours Description of product: Orange-yellow granular, free-flowing solid; melting point about 245 degrees centigrade with decomposition.

*Example 3.—2-[α,α-di(para-methylphenyl)propionyl]-1,3-indanedione,1-hydrazone*

In the same manner as given in Examples 1 and 2, the compound 2 - [α,α-di(para-methylphenyl)propionyl]-1,3-indanedione,1-hydrazone is produced by heating together hydrazine or hydrazine hydrate and 2-[α,α-di(para-methylphenyl)propionyl]-1,3-indanedione (obtained by brominating 3-(para-methylphenyl)butanone-2 with bromine in benzene, reacting the thus-produced 3-bromo-3-(para-methylphenyl)butanone-2 with toluene in the presence of aluminum chloride to produce 3,3-di(para-methylphenyl)butanone-2 and condensing this product with dimethyl phthalate) at the reflux temperature of the reaction mixture, the solid product separated, washed, and dried to give substantially pure 2-[α,α-di(para-methyl phenyl)propionyl] - 1,3-indanedione,1-hydrazone.

*Example 4.—2-(α,α-diphenylpropionyl)-1,3-indanedione, 1-hydrazone and 2-(α,α-diphenylbutyryl)-1,3 - indanedione,1-hydrazone*

In the same manner as given in Examples 1 and 2, the compounds 2-(α,α-diphenylpropionyl) - 1,3-indanedione, 1-hydrazone and 2-(α,α-diphenylbutyryl) - 1,3 - indanedione,1-hydrazone are produced by heating together hydrazone or hydrazinehydrate and 2-(α,α-diphenylpropionyl)-1,3-indanedione (M.P. 142–143° C.; obtained by condensing 3,3-diphenylbutanone-2 with dimethyl phthalate) or 2-(α,α-diphenylbutanone-2 with dimethyl phthalate) or 2-(α,α-diphenylbutyryl) - 1,3 - indanedione (obtained by brominating 3-phenylpentanone-2 with bromine in benzene to produce 3-bromo-3-phenylpentanone-2, reacting this compound with benzene in the presence of aluminum chloride to give 3,3-diphenylpentanone-2, and condensing the product with dimethyl phthalate) at the reflux temperature of the reaction mixture, the solid product separated, washed, and dried to give substantially pure 2-(α,α-diphenylpropionyl)-1,3-indanedione,1-hydrazone or 2-(α,α-diphenylbutyryl) - 1,3 - indanedione,1-hydrazone, depending on the starting material employed.

*Example 5.—2-triphenylacetyl-1,3-indanedione,1-hydrazone*

In the same manner as given in Examples 1 and 2, the compound 2-triphenylacetyl-1,3-indanedione,1-hydrazone is produced by heating together hydrazine or hydrazine hydrate and 2-triphenylacetyl-1,3-indanedione (obtained by reacting acetyl chloride with triphenylmethyl sodium under mild conditions to produce 1,1,1-triphenylacetone and condensing this product with dimethyl phthalate) at the reflux temperature of the reaction mixture, the solid product separated, washed, and dried to give substantially pure 2 - triphenylacetyl-1,3-indanedione,1-hydrazone.

*Example 6. — 2[α,α-di(para-methoxyphenyl)propionyl]-1,3-indanedione,1-hydrazone*

In the same manner as given in Examples 1 and 2, the compound 2-[α,α-di(para-methoxyphenyl)propionyl]-1,3-indanedione,1-hydrazone is produced by heating together hydrazine of hydrazine hydrate and 2-[α,α-di(para-methoxyphenyl)propionyl]-1,3-indanedione (obtained by brominating 3-(para-methoxyphenyl)butanone-2 with bromine in benzene, reacting the 3-bromo-3-(para-methoxyphenyl)butanone-2 thus produced with anisole in the presence of aluminum chloride to produce 3,3-di(para-methoxyphenyl)butanone-2, and condensing this product with dimethyl phthalate) at the reflux temperature of the reaction mixture, the solid product separated, washed, and dried to give substantially pure 2-[α,α-di(para-methoxyphenyl)propionyl]-1,3-indanedione,1-hydrazone.

*Example 7.—2-[tri(para-chlorophenyl)acetyl]-1,3-indanedione,1-hydrazone*

In the same manner as given in Examples 1 and 2, the compound 2-[tri(para-chlorophenyl)acetyl]-1,3-indanedione,1-hydrazone is produced by heating together hydrazine or hydrazine hydrate and 2-[tri(para-chlorophenyl)acetyl]-1,3-indanedione (obtained by reacting acetyl chloride and tri(para-chlorophenyl)methyl sodium under mild conditions and condensing the 1,1,1-tri(para-chlorophenyl)acetone thus produced with dimethyl phthalate) at the reflux temperature of the reaction mixture, the solid product separated, washed, and dried to give substantially pure 2-[tri(para-chlorophenyl)acetyl]-1,3-indanedione,1-hydrazone.

*Example 8.—2-[di(para-chlorophenyl)acetyl]-1,3-indanedione,1-hydrazone*

In the same manner as given in Examples 1 and 2, the compound 2-[di(para-chlorophenyl)acetyl]-1,3 - indanedione,1-hydrazone is produced by heating together hydrazine or hydrazine hydrate and 2-[di(para-chlorophenyl)acetyl]-1,3-indanedione (obtained by reacting acetyl chloride and di(para-chlorophenyl)methyl sodium under mild conditions and condensing the 1,1-di(para-chlorophenyl)acetone thus produced with dimethyl phthalate) at the reflux temperature of the reaction mixture, the solid product separated, washed, and dried to give substantially pure 2-[di(para-chlorophenyl)acetyl]-1,3-indanedione,1-hydrazone.

*Example 9.—2-[di(para-methylphenyl)acetyl]-1,3-indanedione,1-hydrazone and 2-[di(para-methoxyphenyl)acetyl]-1,3-indanedione,1-hydrazone*

In the same manner as given in the preceding Examples 1 through 8, the compounds 2-[di(para-methylphenyl)acetyl]-1,3-indanedione,1-hydrazone and 2-[di(para-methoxyphenyl)acetyl]-1,3-indanedione,1-hydrazone are produced by heating together hydrazine or hydrazine hydrate and 2-[di(para-methylphenyl)acetyl]-1,3 - indanedione (obtained by reacting acetyl chloride and di(para-methylphenyl)methyl sodium under mild conditions and condensing the 1,1-di(para-methylphenyl)acetone thus produced with dimethyl phthalate) or 2-[di(para-methoxyphenyl)acetyl]-1,3-indanedione (obtained by reacting acetyl chloride with di(para-methoxyphenyl)methyl sodium under mild conditions and condensing the 1,1-di(para-methoxyphenyl)acetone thus produced with dimethyl phthalate), in either case at the reflux temperature of the reaction mixture, the solid product separated, washed, and dried to give the substantially pure 2-[di(para-methylphenyl)acetyl]-1,3-indanedione,1-hydrazone or the 2-[di(para-methoxyphenyl)acetyl]-1,3-indanedione,1 - hydrazone, depending upon the starting material employed.

*Example 10.—Other 2-aralkanoyl-1,3-indanedione,1-hydrazones*

In the same manner as given in the foregoing examples, especially Examples 1 and 2, the following compounds are produced by heating together hydrazine or hydrazine hydrate and a particular 2-aralkanoyl-1,3-indanedione, selected from the list hereinbefore given in the order of their previous listing:

2-(α,α-diphenyl-β-methylbutyryl)-1,3-indanedione,1 - hydrazone,
2-(α,α-diphenylvaleryl)-1,3-indanedione,1-hydrazone,
2-(α,α-diphenylhexanoyl)-1,3-indanedione,1-hydrazone,
2-(α,α-diphenylheptanoyl)-1,3-indanedione,1-hydrazone,
2-(α,α-diphenyloctanoyl)-1,3-indanedione,1-hydrazone,
2-(α,α-diphenylnonanoyl)-1,3-indanedione,1-hydrazone,
2-(α,α-diphenyldecanoyl)-1,3-indanedione,1-hydrazone,
2-[di(para-isopropylphenyl)acetyl] - 1,3 - indanedione,1-hydrazone,
2-[di(para-propoxyphenyl)acetyl] - 1,3 - indanedione,1-hydrazone,
2-[di(para-isopropoxyphenyl)acetyl] - 1,3 - indanedione,1-hydrazone,
2-[di(para-bromophenyl)acetyl]-1,3-indanedione,1 - hydrazone,
2-[di(para-fluorophenyl)acetyl]-1,3-indanedione,1 - hydrazone,
2-[di(para-iodophenyl)acetyl]-1,3-indanedione,1 - hydrazone,
2-[phenyl-(para-chlorophenyl)acetyl]-1,3 - indanedione,1-hydrazone,
2-[α-(para-methylphenyl)-α-(para - methoxyphenyl)propionyl]-1,3-indanedione,1-hydrazone,
2-[α-phenyl-α-(para-methoxyphenyl) - propionyl] - 1,3-indanedione,1-hydrazone,
2-[tri(para-methylphenyl)acetyl]-1,3 - indanedione,1-hydrazone,
2-[tri(para-methoxyphenyl)acetyl] - 1,3 - indanedione,1-hydrazone,
2-[tri(para-chlorophenyl)acetyl]-1,3 - indanedione,1-hydrazone,
2-[tri(para-fluorophenyl)acetyl] - 1,3 - indanedione,1-hydrazone,
2-[tri(para-bromophenyl)acetyl]-1,3 - indanedione,1-hydrazone.

CARBONYL DERIVATIVES

*Example 11.—2-diphenylacetyl - 1,3 - indanedione,1-isopropylidene hydrazone*

The derivative of acetone was prepared in the following manner. A mixture of acetone (one part) and chloroform (thirty parts) was treated with excess 2-diphenylacetyl-1,3-indandione,1-hydrazone and one drop of concentrated hydrochloric acid. The mixture was heated at reflux for five minutes and, after cooling, the mixture was filtered to remove the insoluble, unreacted reagent. Ether (ten parts) or ethanol (ten parts) was added to the filtrate and the resulting yellow crystals were filtered, washed with ether and air-dried to produce 0.99 part of 2-diphenylacetyl-1,3-indandione,1-isopropylidene hydrazone. The product melted at 226–227 degrees centigrade after recrystallization from a mixture of methanol and chloroform.

*Analysis.*—Calculated for $C_{23}H_{22}N_2O_2$: C, 79.16; H, 5.49; N, 7.15. Found: C, 79.42; H, 5.62; N, 7.15.

*Example 12. — 2-diphenylacetyl-1,3-indanedione azines with other carbonyl compounds*

In the same manner as given in Example 11, the azines of numerous representative organic carbonyl compounds were prepared by reaction of the organic carbonyl compound with 2-diphenylacetyl-1,3-indanedione,1-hydrazone, the only modification of the reaction being variation in the solvent ratios used for recrystallization, being otherwise in general accord with Example 11 or the following detailed procedure:

A mixture of 0.005 mole of carbonyl compound, 1.58 grams (0.0045 mole) of 2-diphenylacetyl-1,3-indandione,1-hydrazone, twenty to thirty milliliters of chloroform and two drops of concentrated hydrochloric acid is warmed at reflux until a deeply colored, nearly clear solution is obtained. The time for reaction will vary from a few minutes to about ten minutes depending upon the structure of the carbonyl compound. The solution is filtered hot to remove any unreacted reagent. About twenty milliliters of methanol is added to the filtrate. Usually the derivative will crystallize immediately. If there is no crystallization, the solvent is removed in vacuo to a volume of about two milliliters and methanol or anhydrous ether is added. The crystalline product is filtered and recrystallized from the chloroform-methanol mixture using as little chloroform as possible, then oven-dried at seventy to 100 degrees centigrade. Usually one recrystallization is sufficient to give an analytically pure derivative. The derivatives are fluorescent and intensely colored crystalline solids. For quantitative preparation of derivatives, a five to ten percent excess of 2-diphenylacetyl-1,3-indandione,1-hydrazone is used. Sufficient derivative for melting point, analysis and spectra usually can be obtained by using one-half to one-quarter of the amounts specified.

TABLE I.—DERIVATIVES OF CARBONYL COMPOUNDS WITH 2-DIPHENYLACETYL-1,3-INDANEDIONE, 1-HYDRAZONE

| | Color | M.P., °C. (corrected) | M.P. of corresponding 2,4-D.N.P.,[1] °C. |
|---|---|---|---|
| Aliphatic Carbonyl Compounds: | | | |
| acetone | Y | 226–227 | 126 |
| 2-butanone | Y | 197.5–198 | 117 |
| ethyl butyl ketone | Y | 209–210 | 107 |
| 3-methyl-2-butanone | Y | 169–170 | 117 |
| 4-methyl-2-pentanone | Y | 177.5–178.5 | 95 |
| pinacolone | YO | 151–152 | 125 |
| methyl cyclopropyl ketone | Y | 177.5–178.5 | 152 |
| cyclohexanone | Y | 248.5–249 | 162 |
| 2-heptanone | Y | 147.5–148.5 | 74 |
| 2-octanone | Y | 128.5–130.5 | 58 |
| acetaldehyde | Y | 180.5–181.5 | 147 |
| n-butyraldehyde | Y | 167.5–168 | 122 |
| methyl cyclopentyl ketone | Y | 238–239 | 126 |
| 2-pentanone | Y | 166–167 | |
| 2-nonanone | | 126.5–127.5 | |
| 5-nonanone | | 128–128.5 | |
| 2-hexanone | | 135–136 | |
| 2-undecanone | | 104–105 | |
| Aromatic Carbonyl Compounds: | | | |
| benzaldehyde | Y | 239–240 | 237 |
| p-nitrobenzaldehyde | O | 278–279 | 320 |
| acetophenone | Y | 239.5–240 | 250 |
| methyl p-tolyl ketone | Y | 237.5–238.5 | 260 |
| phenyl isopropyl ketone | Y | 204–205 | 163 |
| 1-phenyl-2-propanone | Y | 191.5–192.5 | 156 |
| 1,1-diphenyl-2-propanone | Y | 232–233.5 | 142.5 |
| 3-phenyl-2-butanone | Y | 180.5–181.5 | 173 |
| p-phenylacetophenone | O | 255.5–256 | 242 |
| p-phenylbenzophenone | O | 210–211 | |
| fluorenone | O | 282–283 | 282 |
| p-nitroacetophenone | YO | 297.5–298 | |
| n-butyrophenone | Y | 229.5–230.5 | 190 |
| p-tolualdehyde | Y | 255–255.5 | 234 |
| 1-acetylnaphthalene | Y | 251.5–252.5 | 259 |
| 2-acetylnaphthalene | Y | 251.5–252 | 262 |
| α-phenylpropionaldehyde | | 194.5–195.5 | |
| terephthalaldehyde | | 342–342.5 | |
| 2-(p-acetylphenyl)-4-methylpentane | | 200–200.5 | |
| Unsaturated Carbonyl Compounds: | | | |
| acrolein | Y | 85.5–86.5 | 165 |
| crotonaldehyde | Y | 184.5–185.5 | 190 |
| methyl vinyl ketone | Y | 76.5–77.5 | |
| mesityl oxide | Y | 165–166 | 203 |
| cinnamaldehyde | YO | 225–226 | 255 d. |
| citral | YO | 165–166 | 116 |
| 4-phenyl-3-butene-2-one | OR | 228–229 | |
| Halo Carbonyl Compounds: | | | |
| chloroacetaldehyde | Y | 169.5–170 | 151–155 |
| chloro-2-propanone | Y | 179.5–180 | 124 |
| α-chloroacetophenone | Y | 214.5–215.5 | 212 |
| α-bromo-p-nitroacetophenone | OR | 224–225 | |
| p-fluorophenyl t-butyl ketone | O | 236.5–237.5 | |

| | Color | M.P., °C. (corrected) | M.P. of corresponding 2,4-D.N.P.,[1] °C. |
|---|---|---|---|
| Hydroxy Carbonyl Compounds: | | | |
| 4-hydroxy-4-methyl-2-pentanone | Y | 210–211 | 203 |
| 4-(o-hydroxyphenyl)-3-butene-2-one | OR | 252–253 | |
| salicylaldehyde | O | 245–246 | 252 d. |
| 2-hydroxy-1-naphthaldehyde | O | 274–275 | |
| hydroxyacetophenone | O | 270–271 | |
| Heterocyclic Carbonyl Compounds: | | | |
| 2-furfuraldehyde | Y | 209.5–210.5 | 229 |
| methyl-2-thienyl ketone | O | 268.5–269 | 243 |
| 4-(2-furyl)-3-butene-2-one | O | 233–233.5 | |
| 2-benzoylpyridine | O | 231.5–232 | |
| Miscellaneous Carbonyl Compounds: | | | |
| phenoxy-2-propanone | Y | 193.5–194.5 | |
| pyruvic acid | YO | 251–252 | 218 |
| pyruvic aldehyde | O | 220–221 | |
| ethyl acetoacetate | Y | 179–180 | |
| p-dimethylaminobenzaldehyde | | 271–271.5 | |
| diacetyl (2,3-butanedione) | O | 260.5–261 | |
| p-dimethylaminobenzal-acetone | | 234–235 | |
| triphenylsilyl phenyl ketone | | 209–210 | |

Colors: Y—yellow; YO—yellow orange; O—orange; OR—orange red.

[1] Dinitrophenylhydrazone.

*Example 13.—2-[α,α-di(para-methylphenyl)propionyl]-1,3-indanedione,1-isopropylidene hydrazone*

In the same manner as given in Examples 11 and 12, 2-[α,α-di(para-methylphenyl)propionyl]-1,3-indanedione,1-isopropylidene hydrazone is prepared by the treatment of one part of acetone in thirty parts of chloroform with an excess of 2-[α,α-di(para-methylphenyl)propionyl]-1,3-indanedione,1-hydrazone and one or two drops of concentrated hydrochloric acid. The mixture is heated at reflux for a short time, cooled, and filtered to remove unreacted insoluble reagent. Ether, ethanol or other suitable solvent is added to the filtrate and the resulting crystals are filtered, washed with ether, and air-dried to produce a nearly quantitative yield of product which analyzes correctly for 2-[α,α-di(para-methylphenyl)propionyl]-1,3-indanedione,1-isopropylidene hydrazone and has a high melting point when recrystallized from organic solvents, e.g., a mixture of methanol and chloroform.

In the same manner, the azines of 2-[α,α-di(para-methylphenyl)propionyl]-1,3-indanedione with the additional carbonyl compounds listed in Table I of Example 12 are prepared by reaction of the 2-[α,α-di(para-methylphenyl)propionyl]-1,3-indanedione,1-hydrazone of Example 3 and the selected carbonyl compound.

*Example 14.—2-(α,α-diphenylpropionyl)-1,3-indanedione,1-isopropylidene hydrazone and 2-(α,α-diphenylbutyryl)-1,3-indanedione,1-isopropylidene hydrazone*

In the same manner as given in Examples 11 and 12, 2-(α,α-diphenylpropionyl)-1,3-indanedione,1-isopropylidene hydrazone and 2-(α,α-diphenylbutryryl)-1,3-indanedione,1-isopropylidene hydrazone are prepared by the treatment of one part of acetone in thirty parts of chloroform with an excess of 2-(α,α-diphenylpropionyl)-1,3-indanedione,1-hydrazone or 2-(α,α-diphenylbutyryl)-1,3-indanedione,1-hydrazone and one or two drops of concentrated hydrochloric acid. The mixture is heated at reflux for a short time, cooled, and filtered to remove unreacted insoluble reagent. Ether, ethanol, or other suitable solvent is added to the filtrate and the resulting crystals are filtered, washed with ether, and air-dried to produce a nearly quantitative yield of product which analyzes correctly for 2-(α,α-diphenylpropionyl)-1,3-indanedione,1-isopropylidene hydrazone or 2-(α,α-diphenylbutyryl)-1,3-indanedione,1-isopropylidene hydrazone, depending on the starting 1-hydrazone employed. Each of these products has a high melting point when recrystallized from organic solvents, e.g., a mixture of methanol and chloroform.

In the same manner, the azines of 2-(α,α-diphenylpropionyl)-1,3-indanedione and 2-(α,α-diphenylbutyryl)-1,3-indanedione with the additional carbonyl compounds listed in Table I of Example 12 are prepared by reaction of the 2-(α,α-diphenylpropionyl)-1,3-indanedione,1-hydrazone or 2 - (α,α-diphenylbutyryl)-1,3-indanedione,1-hydrazone of Example 4 and the selected carbonyl compound.

*Example 15.—2-triphenylacetyl-1,3-indanedione,1-isopropylidene hydrazone*

In the same manner as given in Examples 11 and 12, 2-triphenylacetyl-1,3-indanedione,1-isopropylidene hydrazone is prepared by the treatment of one part of acetone in thirty parts of chloroform with an excess of 2-triphenylacetyl-1,3-indanedione,1-hydrazone and one or two drops of concentrated hydrochloric acid. The mixture is heated at reflux for a short time, cooled, and filtered to remove unreacted insoluble reagent. Ether, ethanol, or other suitable solvent is added to the filtrate and the resulting crystals are filtered, washed with ether, and air-dried to produce a nearly quantitative yield of product which analyzes correctly for 2-triphenylacetyl-1,3-indanedione,1-isopropylidene hydrazone and has a high melting point when recrystallized from organic solvents, e.g., a mixture of methanol and chloroform.

In the same manner, the azines of 2-triphenylacetyl-1,3-indanedione with the additional carbonyl compounds listed in Table I of Example 12 are prepared by reaction of the 2-triphenylacetyl-1,3-indanedione,1-hydrazone of Example 5 and the selected carbonyl compound.

*Example 16.—2-[α,α-di(para-methoxyphenyl)propionyl]-1,3-indanedione,1-isopropylidene hydrazone*

In the same manner as given in Examples 11 and 12, 2-[α,α-di(para-methoxyphenyl)propionyl] - 1,3 - indanedione,1-isopropylidene hydrazone is prepared by the treatment of one part of acetone in thirty parts of chloroform with an excess of 2-[α,α-di(para-methoxyphenyl)propionyl]-1,3-indanedione,1-hydrazone and one or two drops of concentrated hydrochloric acid. The mixture is heated at reflux for a short time, cooled, and filtered to remove unreacted insoluble reagent. Ether, ethanol, or other suitable solvent is added to the filtrate and the resulting crystals are filtered, washed with ether, and air-dried to produce a nearly quantitative yield of product which analyzes correctly for 2-[α,α-di(para-methoxyphenyl)propionyl]-1,3-indanedione,1 - isopropylidene hydrazone and has a high melting point when recrystallized from organic solvents, e.g., a mixture of methanol and chloroform.

In the same manner, the azines of 2-[α,α-di(paramethoxyphenyl)propionyl]-1,3-indanedione with the additional carbonyl compounds listed in Table I of Example 12 are prepared by reaction of the 2-[α,α-di(paramethoxyphenyl)propionyl]-1,3-indanedione,1 - hydrazone of Example 6 and the selected carbonyl compound.

*Example 17.—2-[tri(para-chlorophenyl)acetyl]-1,3-indanedione,1-isopropylidene hydrazone*

In the same manner as given in Examples 11 and 12, 2 - [tri(para-chlorophenyl)acetyl]-1,3-indanedione,1 - isoproylidene hydrazone is prepared by the treatment of one part of acetone in thirty parts of chloroform with an excess of 2-[tri(para-chlorophenyl)acetyl]-1,3-indanedione,1-hydrazone and one or two drops of concentrated hydrochloric acid. The mixture is heated at reflux for a short time, cooled, and filtered to remove unreacted insoluble reagent. Ether, ethanol, or other suitable solvent is added to the filtrate and the resulting crystals are filtered, washed with ether, and air-dried to produce a nearly quantitative yield of product which analyzes correctly for 2-[tri(para-chlorophenyl)acetyl] - 1,3 - indanedione,1-isopropylidene hydrazone and has a high melting point when recrystallized from organic solvents, e.g., a mixture of methanol and chloroform.

In the same manner, the azines of 2-[tri(para-chlorophenyl)acetyl]-1,3-indanedione with the additional carbonyl compounds listed in Table I of Example 12 are prepared by reaction of the 2-[tri(para-chlorophenyl)acetyl]-1,3-indanedione,1-hydrazone of Example 7 and the selected carbonyl compound.

*Example 18.—2-[di(para-chlorophenyl)acetyl]-1,3-indanedione,1-isopropylidene hydrazone*

In the same manner as given in Examples 11 and 12, 2 - [di(para-chlorophenyl)acetyl]-1,3-indanedione,1 - isopropylidene hydrazone is prepared by the treatment of one part of acetone in thirty parts of chloroform with an excess of 2-[di(para-chlorophenyl)acetyl]-1,3-indanedione,1-hydrazone and one or two drops of concentrated hydrochloric acid. The mixture is heated at reflux for a short time, cooled, and filtered to remove unreacted insoluble reagent. Ether, ethanol, or other suitable solvent is added to the filtrate and the resulting crystals are filtered, washed with ether, and air-dried to produce a nearly quantitative yield of product which analyzes correctly for 2 - [di(para-chlorophenyl)acetyl]-1,3-indanedione,1-isopropylidene hydrazone and has a high melting point when recrystallized from organic solvents, e.g., a mixture of methanol and chloroform.

In the same manner, the azines of 2-[di(para-chlorophenyl)acetyl]1,3-indanedione with the additional carbonyl compounds listed in Table I of Example 12 are prepared by reaction of the 2-[di(para-chlorophenyl)acetyl]-1,3-indanedione,1-hydrazone of Example 8 and the selected carbonyl compound.

*Example 19. — 2 - [di(para-methylphenyl)acetyl] - 1,3-indanedione 1-isopropylidene hydrazone, 2-[di(paramethoxyphenyl)acetyl]-1,3 - indanedione 1 - isopropylidene hydrazone, and related azines*

In the same manner as given in the preceding Examples 11 through 18, the mixed azines of 2-[di(para-methylphenyl)acetyl]-1,3-indanedione and 2-[di(paramethoxyphenyl)acetyl]-1,3-indanedione with acetone or with the additional carbonyl compounds of Table I of Example 12 are prepared by reaction of the selected carbonyl compound and either 2-[di(para-methylphenyl)acetyl]-1,3-indanedione,1-hydrazone or 2-[di(para-methoxyphenyl)acetyl]-1,3-indanedione,1-hydrazone, which starting materials are obtained as shown in Example 9.

*Example 20.—Other 2-aralkanoyl-1,3-indanedione azines with carbonyl compounds*

In the same manner as given in Examples 11 through 19, the various 2-aralkanoyl-1,3-indanedione, 1-hydrazones of Example 10 are reacted with acetone or the additional carbonyl compounds listed in Table I of Example 12 to produce mixed azines of the same type and general characteristics as there specified for the mixed azines with 2-diphenylacetyl-1,3-indanedione. These compounds are generally well-defined, high melting, fluorescent solids which are useful in the identification of the organic carbonyl compound moieties thereof.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. A 2-aralkanoyl-1,3 - indanedione,1 - monohydrazone of the formula:

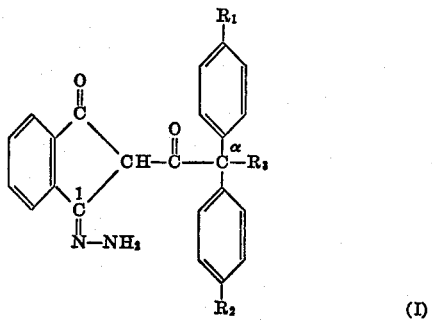

(I)

wherein $R_1$ and $R_2$ are selected from the group consisting of hydrogen, lower-alkyl, low-alkoxy, and halogen, and wherein $R_3$ is selected from the group consisting of hydrogen, lower-alkyl, and

wherein R' has the same value as $R_2$.

2. A compound of claim 1 wherein $R_1$, $R_2$, and $R_3$ are all lower-alkyl.

3. 2 - [α,α - di(para - methylphenyl)propionyl] - 1,3-indanedione,1-hydrazone.

4. A compound of claim 1 wherein $R_1$ and $R_2$ are hydrogen and $R_3$ is lower-alkyl.

5. 2 - (α,α - diphenylbutyryl) - 1,3 - indanedione,1 - hydrazone.

6. 2-(α,α-diphenylpropionyl) - 1,3 - indanedione,1 - hydrazone.

7. 2 - [α,α - di(para - methoxyphenyl)propionyl] - 1,3-indanedione,1-hydrazone.

8. 2-[tri(para-halophenyl)acetyl] - 1,3 - indanedione,1-hydrazone.

9. 2 - [tri(para - chlorophenyl)acetyl] - 1,3 - indanedione,1-hydrazone.

10. 2-triphenylacetyl-1,3-indanedione,1-hydrazone.

11. 2-[di(para-halophenyl)acetyl]-1,3 - indanedione,1-hydrazone.

12. 2 - [di(para - chlorophenyl)acetyl] - 1,3 - indanedione,1-hydrazone.

13. 2-diphenylacetyl-1,3-indanedione,1-hydrazone.

14. 2 - [di(para - methylphenyl)acetyl] - 1,3 - indanedione,1-hydrazone.

15. 2 - [di(para - methoxyphenyl)acetyl] - 1,3 - indanedione,1-hydrazone.

References Cited in the file of this patent
UNITED STATES PATENTS

Re. 23,080   Eck et al. _____ Jan. 25, 1949